(No Model.)  
4 Sheets—Sheet 1.
C. EFROS.
APPARATUS FOR HANDLING FLUIDS.
No. 598,501. Patented Feb. 8, 1898.
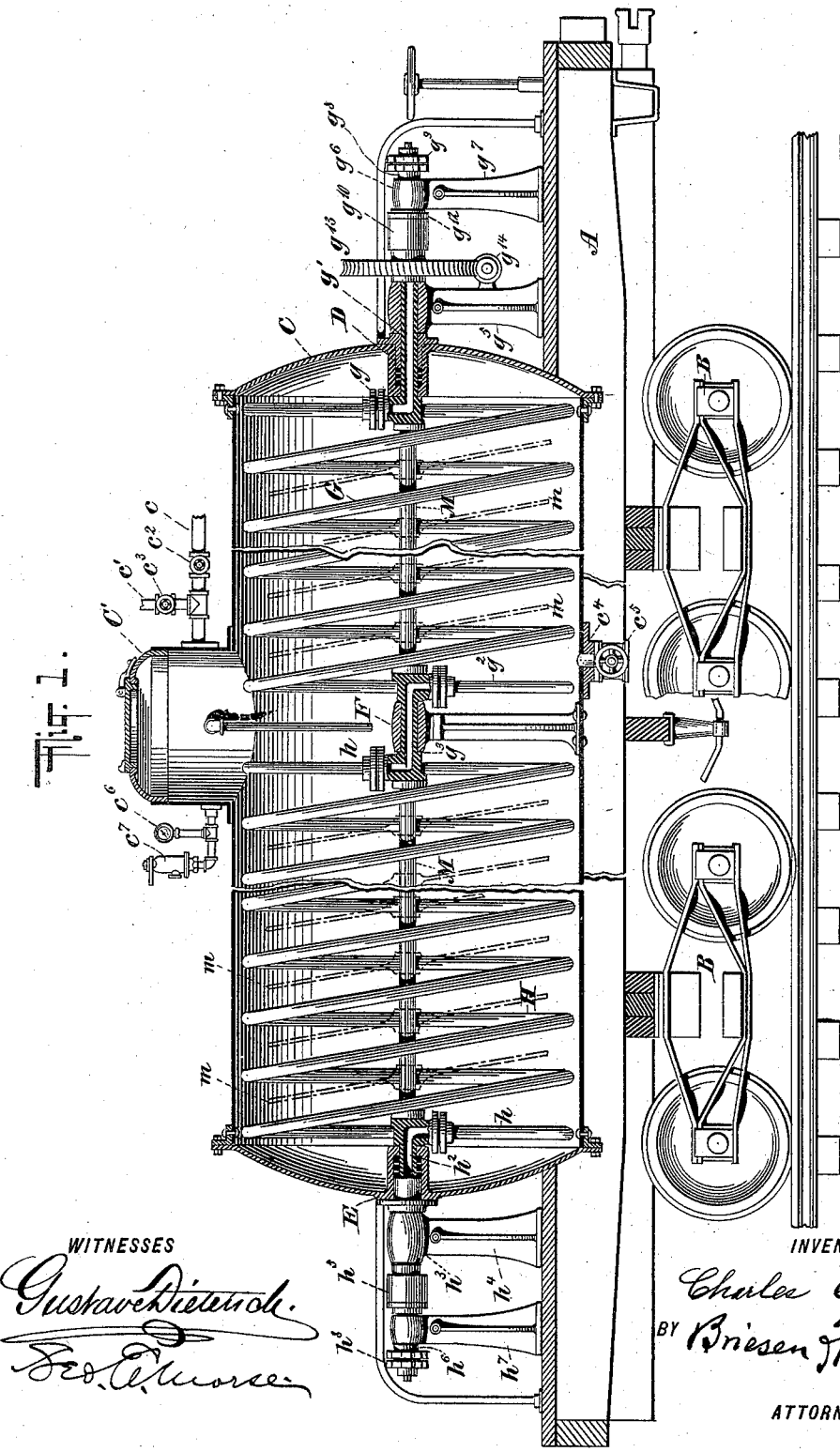
WITNESSES  
INVENTOR  
Charles Efros,  
BY Briesen & Knauth  
ATTORNEYS.

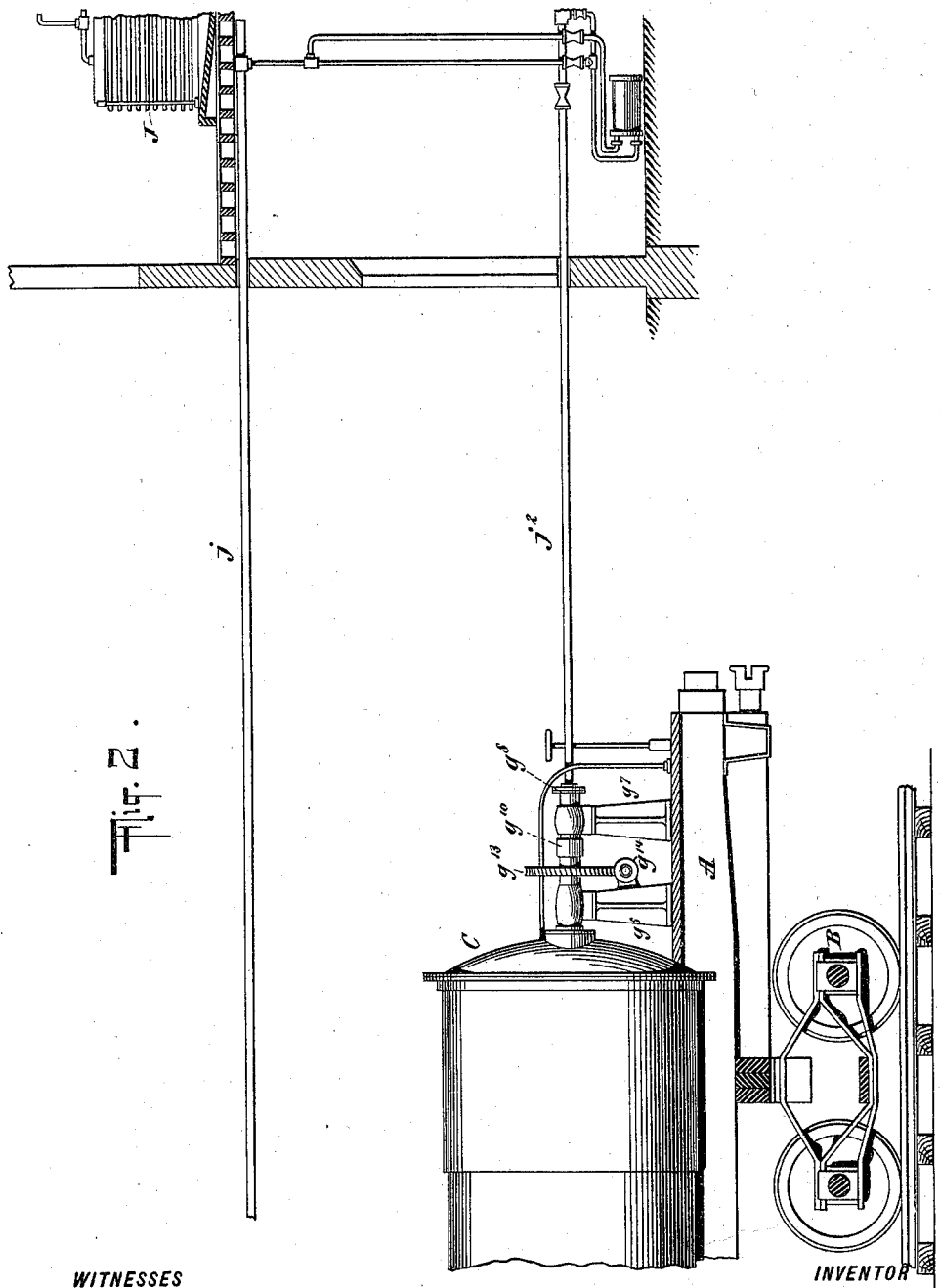

(No Model.) 4 Sheets—Sheet 3.
C. EFROS.
APPARATUS FOR HANDLING FLUIDS.
No. 598,501. Patented Feb. 8, 1898.
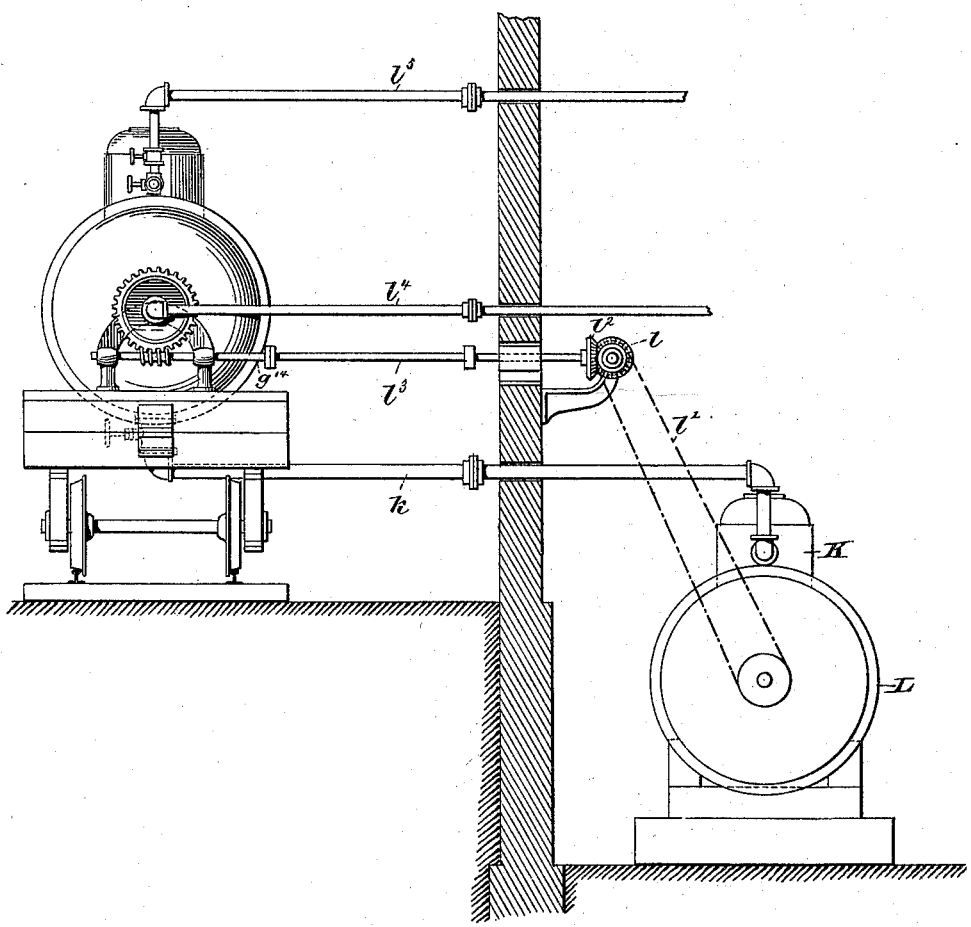
WITNESSES
INVENTOR
ATTORNEYS.

(No Model.) 4 Sheets—Sheet 4.
C. EFROS.
APPARATUS FOR HANDLING FLUIDS.
No. 598,501. Patented Feb. 8, 1898.
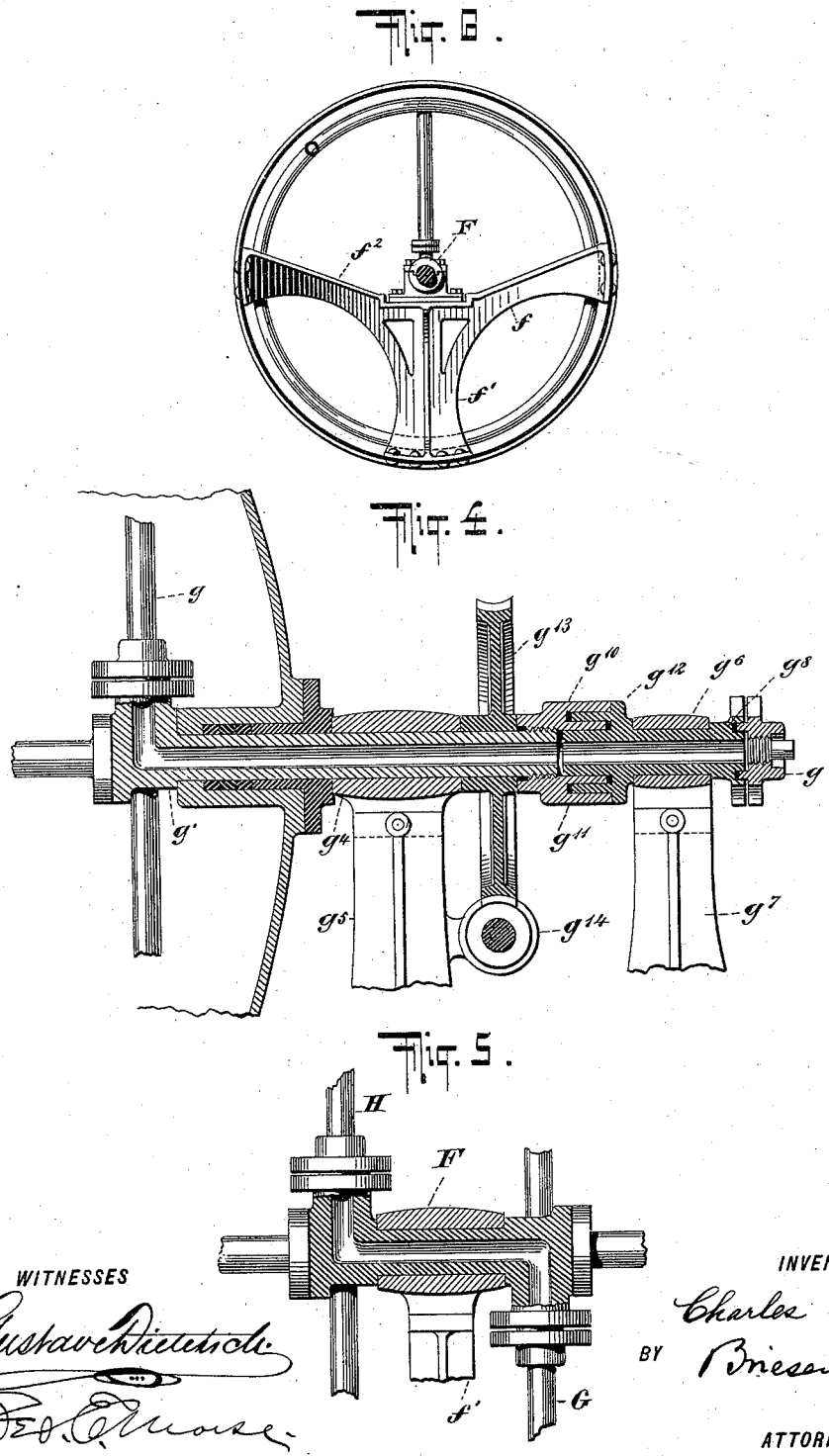

UNITED STATES PATENT OFFICE.

CHARLES EFROS, OF NEW YORK, N. Y., ASSIGNOR TO VINCENT P. TRAVERS, OF SAME PLACE.

APPARATUS FOR HANDLING FLUIDS.

SPECIFICATION forming part of Letters Patent No. 598,501, dated February 8, 1898.

Application filed September 30, 1896. Serial No. 607,382. (No model.)

*To all whom it may concern:*

Be it known that I, CHARLES EFROS, a subject of the Emperor of Russia, residing in the city, county, and State of New York, have invented an Improved Apparatus for Handling Fluids, of which the following is a specification.

My present invention consists in an apparatus for handling compounds of a fluid nature.

My invention consists in the arrangement of apparatus hereinafter set forth and claimed, and will be understood by referring to the following description of the accompanying drawings, annexed hereto and forming part hereof, in which drawings—

Figure 1 is a broken-away longitudinal sectional elevation of a car, forming part of my invention. Fig. 2 is a fragmental elevation of an apparatus for freezing the contents of the car. Fig. 3 is an end elevation of an apparatus for thawing out and drawing off the contents of the car, the same being shown with the car connected. Fig. 4 is a sectional view of the apparatus for rotating the refrigerating-coil in the car. Fig. 5 is a detail sectional view of a portion of the axle upon which the refrigerating-coil turns. Fig. 6 is an elevation of the spider which supports the bearings of the refrigerating-coil shaft.

Before proceeding to describe my invention in detail I desire to state, preliminarily, that there are numerous substances which require to be refrigerated in the process of manufacture or before transportation—such, for instance, as compounds for treating vegetable fiber and liquid explosives, such as nitroglycerin. By my invention I propose to run such substances into a tank-car provided with a refrigerating apparatus which forms part thereof and freeze the substance *in situ*, thereupon transporting the said substance in a frozen or solidified condition in the said tank-car until the destination is reached and then thawing out or softening the said substance and withdrawing it from the car. A car for this purpose and embodying my invention is shown in Fig. 1 and is exhibited as consisting of a platform A, provided with running-gear B and a tank C, which may be suitably jacketed or covered with a non-conducting covering. At the ends of the tank journals D E are provided and in the middle of the tank a journal or bearing F is provided, which is supported upon a suitable spider, consisting of arms $f$ $f'$ $f^2$, mounted upon the shell of the tank C. A refrigerating-coil is contained within the tank and is shown in the present instance as consisting of two helically-coiled sections G H. One end, $g$, of the section G is in communication with a hollow sleeve or axle section $g'$ and the other end, $g^2$, of the said section G is connected to and in open communication with an angular hollow shaft or sleeve $g^3$, which is carried in the bearing or journal F.

The end $h$ of the coil H is connected to and in open communication with the sleeve or shaft $g^3$, and the end $h'$ of the said coil-section H is connected to and in open communication with the hollow sleeve or axle $h^2$, which is journaled in the bearing or journal E in the wall or end of the tank C. Intervening between the sleeves $g'$ and $g^3$ and $g^3$ and $h^2$ are shafts M, carrying stirrer or agitator blades $m$, (shown in dotted lines in Fig. 1,) set so as to form a screw. The sleeve $g'$ is journaled in the bearing $g^4$, which is carried upon a standard $g^5$, resting on the platform A, the sleeve $h^2$ being journaled in the bearing $h^3$, carried upon a standard $h^4$. These standards and bearings form the external support for the sleeves or shafts $g'$ $h^2$. Journaled in a bearing $g^6$, carried in a standard $g^7$ on the platform A, is a sleeve $g^8$, which is adapted to be closed at one end by a plug $g^9$ and carries upon its opposite end a coupling $g^{10}$, comprising separate members $g^{11}$ and $g^{12}$, the member $g^{11}$ being screwed upon the end of the shaft or sleeve $g'$. Carried also upon the shaft $g'$ is a worm-wheel $g^{13}$, which is adapted to be turned by a worm-shaft $g^{14}$, supported by the standard $g^5$, so that turning the worm-shaft $g^{14}$ will revolve the worm-wheel $g^{13}$, thereby revolving the coil within the tank, communication between the sleeve $g^8$ and the sleeve $g'$ being maintained during the rotation of the said shaft $g'$ through the medium of the coupling $g^{10}$. The sleeve $h^2$ is joined by means of a flexible coupling $h^5$ to a sleeve $h^6$, which is journaled in and supported by a standard $h^7$ and may be provided with a plug $h^8$, the last-mentioned part being similar to the corresponding parts at the opposite end of the car, so that communication between the sleeve $h^6$ and $h^3$ will be maintained during revolution of the last-named sleeve. Fluid may be introduced into the tank through the liquid-inlet pipe $c$, which empties into the dome C', the said liquid-inlet $c$ being also provided with an air-inlet $c'$, both of which are governed by suitable stop-cocks, the stop-cock $c^2$ serving to control the liquid-inlet and the stop-cock $c^3$ serving to control the air-inlet. At or near the bottom of the tank a liquid-outlet $c^4$ is provided, which is controlled by a valve or cock $c^5$. A suitable pressure-gage $c^6$ and relief-valve $c^7$ may be provided, if desired.

I introduce the liquid desired to be transported into the tank C through the liquid-inlet pipe $c$, and at the proper time close off the said influx of liquid and attach the effluent-pipe $j$ of a suitable ice-machine or ammonia-compressor J, (see Fig. 2,) to one end or the other of the rotating coil. In the present instance this effluent-pipe $j$ is designed to be connected to the sleeve or shaft $h^6$, the cap $h^8$ being removed for that purpose. The return-pipe $j^2$ of the refrigerating-machine or compressor is connected to the opposite pipe of the tank, shown in the present instance as connected to the pipe $g^8$. Power is applied to the worm-shaft $g^{14}$ and the refrigerating-coil carrying the refrigerating liquid thereby revolved and the liquid contained in the tank thus congealed *in situ*. After the liquid has become congealed or solidified the flow of refrigerating fluid may be suspended and the tank disconnected from the refrigerating-machine and the caps $h^8$ and $g^9$ put back in place. The car may now be transported, thus transporting the liquid in a solidified condition to its destination. When the car reaches its destination, it is attached to an apparatus for removing its contents. Such an apparatus is shown in Fig. 3. In this figure a tank K is located adjacent to an engine L, which is belted to a shaft carrying a bevel-gear $l$ by means of a belt $l'$. The bevel-gear $l$ meshes with a bevel-gear $l^2$, carried upon a worm-shaft $l^3$, which may be coupled to the worm-shaft $g^{14}$. Communicating with the tank K is a draw-off pipe $k$, which may be connected, as shown, to the draw-off cock or outlet-passage $c^4$ of the tank. A pipe $l^4$, carrying steam, may be connected to the coil through one or the other of the sleeves $g^8$ $h^6$ for the purpose of providing a circulation of steam through the coil, which may be rotated at the same time by means of the engine L and intermediate connections. An air-pipe $l^5$, carrying a supply of air, may be connected to the air-inlet $c'$ to assist in forcing out the contents of the tank through a draw-off cock $c^4$, so that the substance in the tank will be melted by the steam passing through the rotating coil and will be forced out of the tank by means of the air-pressure in the pipe $l^5$.

It is quite obvious that the apparatus may be put to other uses and may be modified to suit local conditions.

What I claim, and desire to secure by Letters Patent, is—

1. In a transporting-vehicle, the combination of a running-gear, a tank secured to and forming part of said vehicle, a rotary coil located within the tank, means connected with said coil for rotating it, and agitator-blades independent of the coil but adapted to rotate therewith.

2. In a liquid-transporting vehicle, the combination of a running-gear, a closed tank secured to and forming part of said vehicle, means for conveying fluid and air to said closed tank, means for controlling the admission of the fluid and air to the tank, a rotary coil contained within said tank, means connected with said coil for rotating it and agitator-blades independent of the coil but adapted to rotate therewith.

3. In a liquid-transporting vehicle, the combination of a running-gear, a closed tank secured to and forming part of said vehicle, means for conveying fluid and air to said closed tank, means for controlling the admission of the fluid and air to the tank and a two-part rotary refrigerating-coil contained within said tank, a bearing in the tank, a hollow shaft supported in said bearing, a connection between said shaft and each section of the two-part coil, means connected with said coil for rotating it, said means comprised in part by inlet and outlet sleeves passing through the walls of the tank and communicating with the refrigerating-coil and agitator-blades independent of the coil but adapted to rotate therewith.

CHARLES EFROS.

Witnesses:
GEORGE E. MORSE,
MAURICE BLOCK.